US009700476B2

(12) United States Patent
Hoel et al.

(10) Patent No.: US 9,700,476 B2
(45) Date of Patent: Jul. 11, 2017

(54) PATIENT PLATFORM CONNECTION DEVICE

(71) Applicants: Stephen Hoel, Union City, CA (US); Gregory Hirth, Union City, CA (US)

(72) Inventors: Stephen Hoel, Union City, CA (US); Gregory Hirth, Union City, CA (US)

(73) Assignee: MIZUHO ORTHOPEDIC SYSTEMS, INC., Union City, CA (US)

(*) Notice: Subject to any disclaimer, the term of this patent is extended or adjusted under 35 U.S.C. 154(b) by 294 days.

(21) Appl. No.: 14/616,530

(22) Filed: Feb. 6, 2015

(65) Prior Publication Data

US 2016/0228316 A1 Aug. 11, 2016

(51) Int. Cl.

| | |
|---|---|
| ***F16D 1/00*** | (2006.01) |
| ***A61G 13/10*** | (2006.01) |
| ***A61G 13/02*** | (2006.01) |
| ***A61G 13/04*** | (2006.01) |
| ***A61G 13/06*** | (2006.01) |

(52) U.S. Cl.

CPC ............. *A61G 13/10* (2013.01); *A61G 13/02* (2013.01); *A61G 13/04* (2013.01); *A61G 13/06* (2013.01); *A61G 13/104* (2013.01); *Y10T 403/59* (2015.01)

(58) Field of Classification Search

CPC ........ A61G 13/00; A61G 13/02; A61G 13/04; A61G 13/10; A61G 13/12; A61G 13/06; A61G 13/104; Y10T 403/59

USPC ...................................... 403/321; 5/618, 621

See application file for complete search history.

(56) References Cited

U.S. PATENT DOCUMENTS

| | | | | |
|---|---|---|---|---|
| 5,131,106 | A * | 7/1992 | Jackson | A61G 13/00 5/607 |
| 5,152,368 | A * | 10/1992 | Heiden | E04G 5/00 182/118 |
| 6,260,220 | B1 * | 7/2001 | Lamb | A61G 13/02 5/601 |
| 7,216,385 | B2 * | 5/2007 | Hill | A61G 13/12 128/845 |
| 7,428,760 | B2 * | 9/2008 | McCrimmon | A47C 19/045 5/11 |
| 7,523,905 | B2 * | 4/2009 | Timm | A47B 21/0314 108/138 |
| 7,565,708 | B2 * | 7/2009 | Jackson | A61G 7/001 5/607 |
| 7,739,762 | B2 * | 6/2010 | Lamb | A61G 13/08 5/618 |
| 8,584,281 | B2 * | 11/2013 | Diel | A61G 13/0036 5/601 |
| 8,844,077 | B2 * | 9/2014 | Jackson | A61G 7/001 5/607 |
| 2010/0293713 | A1 * | 11/2010 | Sharps | A61G 7/001 5/86.1 |

(Continued)

*Primary Examiner* — Michael P Ferguson
*Assistant Examiner* — Nahid Amiri
(74) *Attorney, Agent, or Firm* — Theodore J. Bielen, Jr.

(57) ABSTRACT

An adjustable support apparatus for a surgery table utilizing a platform having first and second end portions. First and second end supports are used to mount the platform which is adjusted by a carriage having a pawl operator. The carriage includes studs having support surfaces for the platform. A tower utilizing a gear rack interacts with the carriage pawl operator to position the platform relative to the first and second end support of the surgery table.

5 Claims, 9 Drawing Sheets

(56) References Cited

U.S. PATENT DOCUMENTS

2014/0020181 A1* 1/2014 Jackson ................. A61G 13/04
5/607

* cited by examiner

PATIENT PLATFORM CONNECTION DEVICE

BACKGROUND OF THE INVENTION

The present invention relates to a patient platform connection device used with a surgery table.

Medical and surgical procedures require placement of a patient on a surgical table in various positions to allow a practitioner surgical access. For example, a patient platform on a surgical table must be moved upwardly or downwardly, or tilted about a horizontal axis. In addition, the head or foot portions of a patient platform on a surgical table must be independently depressed or elevated to achieve particular orientations, referred to as Trendelenberg or reverse Trendelenberg positions.

As heretofore stated it is important to configure a surgery table to accommodate the needs of a surgeon. In certain cases, table movement may be employed to shift the patient's internal organs relative to the patients head for the sake of surgical access. In addition, a reverse Trendelenberg position on a surgical table may also increase blood flow to the patient's head to minimize shock during surgery and permit anterior or posterior access to the patient.

In the past, adjustments of surgical table platforms have been manually accomplished by the interaction of such surgical platform with the end supports of a surgical table specifically adjustments of the surgical platform had been achieved through the removal and insertion of a rod between parallel bars having openings for accommodating the rod. Although being functional, such a system requires great care on the part of the surgical team to prevent a patient from accidentally being lowered on the surgical platform. In addition, the raising, lowering, tilting, and independently elevating or lowering the head and foot portions of a surgical platform was often difficult and inconvenient through the mechanisms of the prior art. Reference is made to U.S. Pat. No. 6,260,220 as representative of a typical prior art adjustable surgery table.

A positioning system for a surgical table that is safe and easy to manipulate would be a notable advance in the medical field.

SUMMARY OF THE INVENTION

In accordance with the present invention a novel and useful adjustable support apparatus for a surgery table is herein provided.

The apparatus of the present invention is utilized with a patient platform having a first and second end portions. First and second end supports are also employed with the present apparatus and are linked to the first and second end portions of the patient platform in a manner that is safe and easy to accomplish.

In this regard, the apparatus includes a crossbar mounted to and forming a portion of either end support. A carriage is also employed and utilizes a base housing and first and second studs that extend from the base housing. Each of the first and second studs provides an engagement surface for connectors associated with either end portion of the patient platform. Each connector may take the form of a claw-like member that rotatably locks at the first and second stud engagement surfaces extending from the base housing of the carriage.

In addition, at least one tower is employed to be removably fixed to the first and/or second end supports, preferably to the crossbar. Each tower is provided with at least one gear rack having alternating recesses and shoulders. The combined carriage and one or more towers forms a tower assembly. A controller associated with the carriage moves at least one pawl into and out of engagement with any of the gear racks, thus, allowing the end portions of the patient platform and the carriage to move upwardly and downwardly relative to a tower through a ratchet mechanism. Needless to say, the use of a carriage, one or more towers and controllers, hereinabove described, may be utilized with the first and second end supports of the surgery table. Consequently, the first, and second end portions of the patient platform may be independently raised and lowered relative to the first and second end supports.

Moreover, each tower assembly may include a mechanism for removably fixing the same to the crossbar of the first, and/or second end support. In essence the tower may be formed with a single protuberance having a boss engaging an opening in a crossbar. However, such mechanism preferably includes the provision of first and second openings in the crossbar. Each tower is then fitted with first and second protuberances. The first protuberance rotatably fits within the first opening of a crossbar, while the second protuberance fits into the second opening of such cross bar upon rotation of the first protuberance. A locking mechanism audibly actuates and holds the second protuberance in the second opening of the crossbar, achieving a bayonet type of connection.

It may be apparent that a novel and useful adjustable support apparatus for a surgery table has been herein above described.

It is therefore an object of the present invention to provide an adjustable support apparatus for a surgery table that provides for patient safety and facilitates manipulation by a surgical staff.

Another object of the present invention is to provide an adjustable support apparatus for a surgery table that permits multiple movements of a patient platform to allow positioning of a patient that is convenient for a surgeon.

Another object of the present invention is to provide an adjustable support apparatus for a surgery table that eliminates hazards associated with surgery tables of the prior art, including inadvertent unlocking of the table, uncontrolled movement of the table, or inability to position the patient platform in certain instances.

Another object of the present invention is to provide an adjustable support apparatus for a surgery table that provides for audible indicators, signaling locking and unlocking of various components of the surgery table.

Another object of the present invention is to provide an adjustable support apparatus for a surgery table that eliminates carriage drift under patient weight.

Another object of the present invention is to provide an adjustable support apparatus for a surgery table that is relatively maintenance free.

Another object of the present invention is to provide an adjustable support apparatus for a surgery table which achieves a high degree of stability during use.

Another object of the present invention is to provide an adjustable support apparatus for a surgery table that employs a tower attached to an end support by the way of a crossbar via a bayonet type fitting that prevents removal of a linked patient supporting tabletop.

Yet another object of the present invention is to provide an adjustable support apparatus for a surgery table that complies with governmental standards for lift limits.

The invention possesses other objects and advantages especially as concerns particular characteristics and features thereof which will become apparent as the specification continues.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof. Such descriptions should be taken in conjunction with the prior delineated drawings to fully understand the idea sought for patenting.

Figure 1:
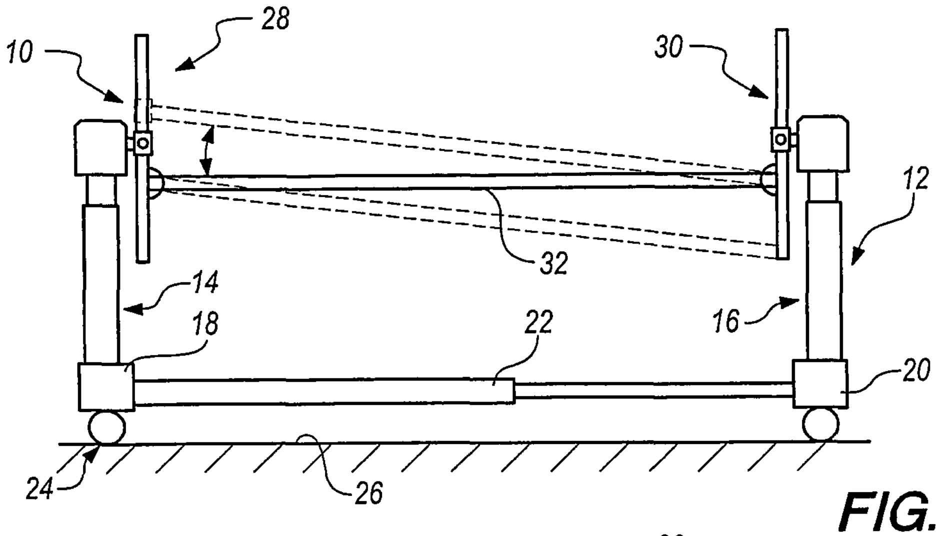
FIG. 1 is a side schematic elevational view of the apparatus of the present invention indicating a reverse Trendelenberg movement of an H-frame in phantom.
Figure 2:
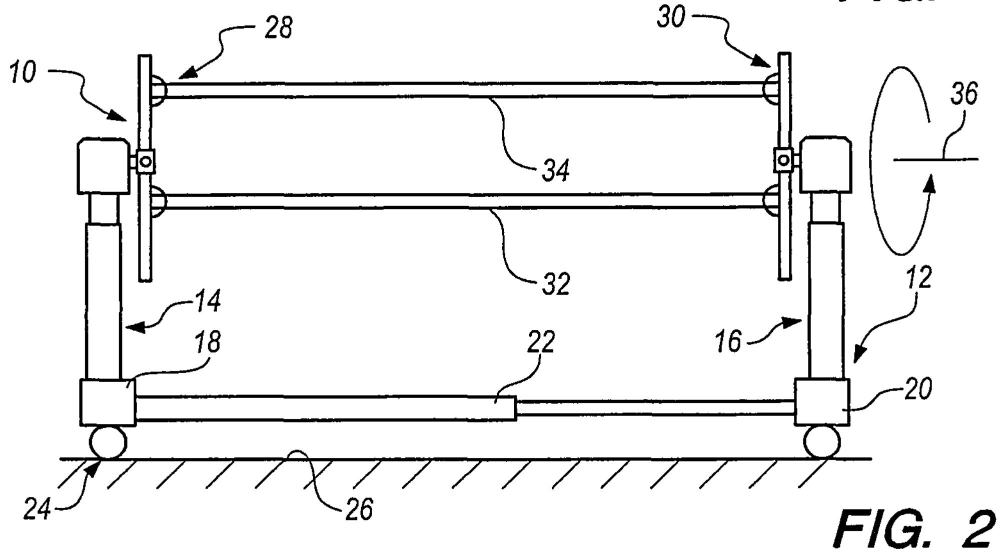
FIG. 2 is a side elevational view of the apparatus of the present invention utilizing an H-frame and a patient support.
Figure 3:
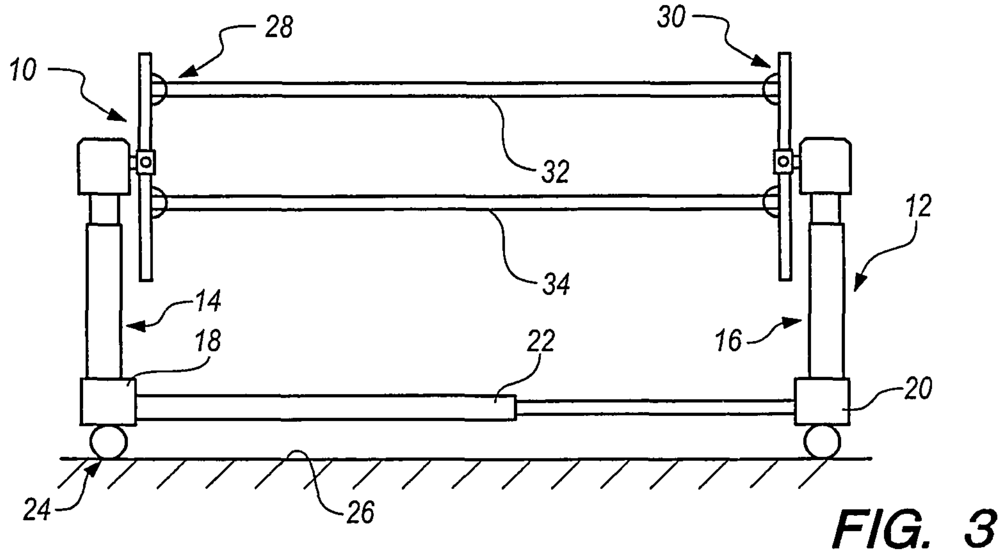
FIG. 3 is a side schematic elevational view of the apparatus of the present invention where the H-frame and patient support have been rotated 180 degrees.

The adjustable support apparatus for a surgery table of the present invention is shown in the drawings, as a whole, by reference character 10. With reference to FIGS. 1-3, it may be observed that apparatus 10 is used in conjunction with a surgery table 12. Surgery table 12 is shown as possessing end supports or posts 14 and 16. Posts 14 and 16 are connected to feet or bases 18 and 20, respectively. Bases 18 and 20 are linked to one another by spanning member 22. Plurality of casters 24 allow surgery table 12 to be rolled along surface 26.

Apparatus 10 further includes tower assemblies 28 and 30 found at the head and foot end of surgical table 12, respectively. FIG. 1 denotes surgical table 12 with a basic H-frame 32 linked to tower assembles 28 and 30. In addition, FIGS. 2 and 3 show an additional table top or platform 34 which may take the form of a spinal surgery top, orthopedic trauma top, radio-lucent imaging top, and the like. It should be seen that FIGS. 2 and 3 represents that the position of H-frame 32 and table top 34 may be reversed by rotation about axis 36 through a known mechanism. In addition, FIG. 1 illustrates the fact that H-frame 32 may be moved vertically along either tower assembly 28 and/or 30 through the apparatus 10 of the present application, which will be discussed in greater detail as the specification continues.

Figure 4:
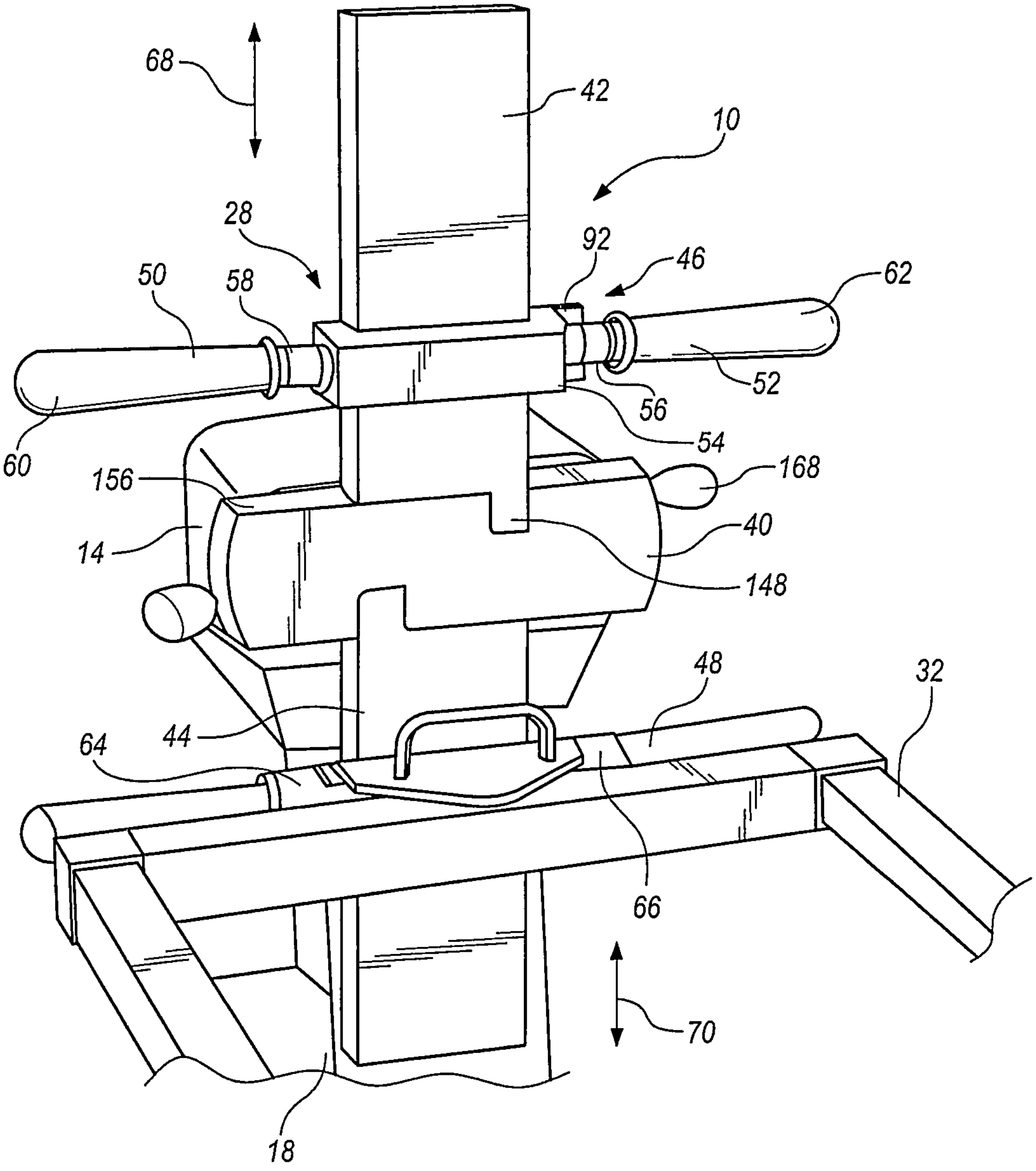
FIG. 4 is a top left isometric view of the head portion of a surgery table utilizing the apparatus of the present application.

With reference now to FIG. 4, apparatus 10 is depicted in further delineated. Apparatus 10 includes tower assembly 28 associated with first end support at the head end of surgery table 12. It should be noted that a similar tower assembly 30 is associated with second end support 16 at the foot end of surgery table 12, shown schematically in FIGS. 1-3. Tower assembly 28 includes a crossbar or mount 40 which is connected directly to and forms a part of first end support 14. Crossbar 40 orients towers 42 and 44 outwardly therefrom and, as depicted in FIG. 4, in a generally vertical orientation. Tower assembly 28 also possesses carriages 46 and 48 that move along towers 42 and 44 via a ratchet mechanism which will be further discussed hereinafter. Carriage 46 is depicted in FIG. 4, for clarity without engagement and support of a table top as shown in FIGS. 2 and 3. Carriage 46 includes a first stud 50 and a second stud 52 that extend from a base housing 54. Engagement surfaces 56 and 58 lie intermediate base housing 54 and handles 60 and 62 of studs 50 and 52, respectively. Engagement surfaces 56 and 58 are shown as being generally cylindrical members. However, engagement surface 58 is longer than engagement surface 56 in order to aid in the orientation of table top 34 or H-frame 32. With further reference to FIG. 4, it may be seen that H-frame 32 is connected to carriage 48 by the use of connectors 64 and 66, which will be further detailed as the specification continues. Directional arrows 68 and 70 are intended to show the inward and outward movement of carriages 46 and 48 relative to crossbar 40, respectively, as well as a table top connected to carriage 46 and H-frame 32 connected to carriage 48.

Figure 5:
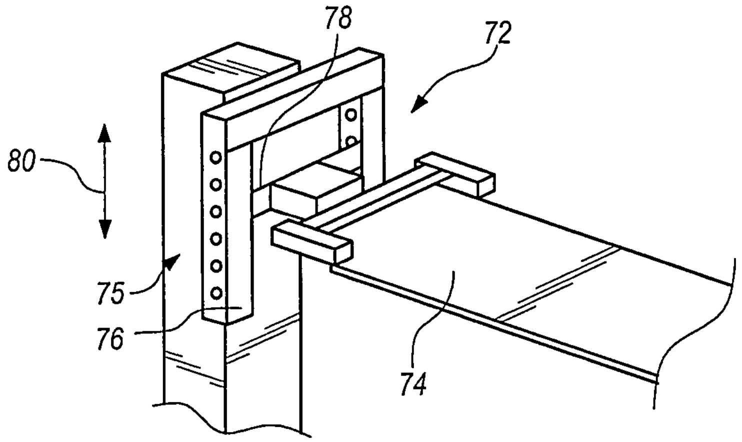
PRIOR ART FIG. 5
FIG. 5 is a top left partial isometric view of a surgery table employing an adjustment mechanism of the prior art.

Turning now to FIG. 5, a schematic rendition of a prior art adjustment mechanism for a surgery table 72 is depicted, such as that found in U.S. Pat. No. 6,260,220. A patient platform 74 is held to an H-frame 76 by the use of a removable rod or pin 78 which selectively engages openings 75 through H-frame 76. Needless to say, rod 78 must be cautiously removed and reinserted in any of the openings of H-frame 76 to move table top 74 upwardly or downwardly according to directional arrow 80.

Figure 6:
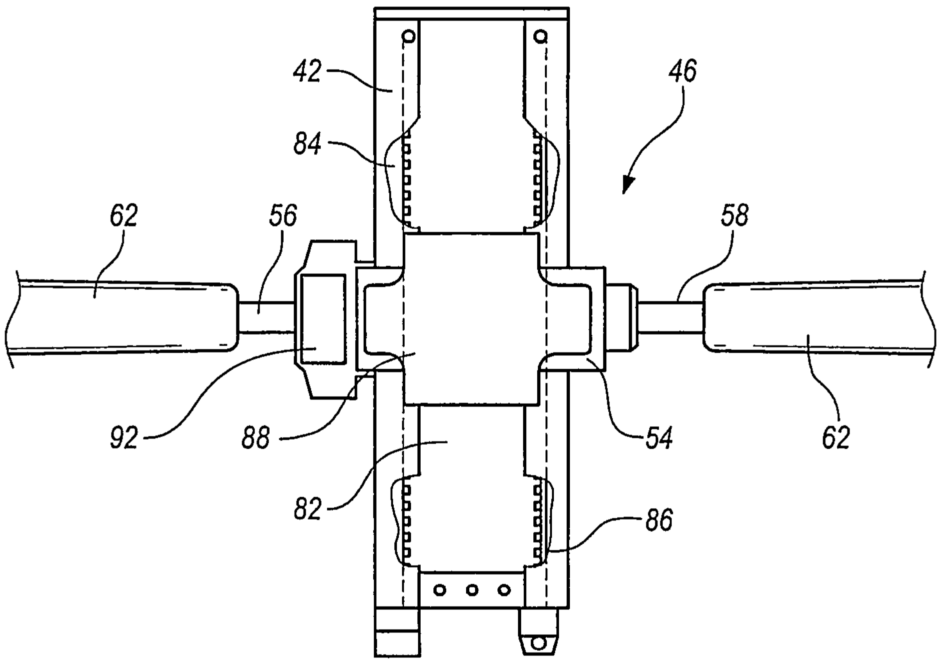
FIG. 6 is a front elevational view of the tower assembly including a pair of towers and carriage mechanism of the present invention.

In contrast, the adjustment apparatus 10 of the present application offers superior advantages and is illustrated in FIG. 6 by exemplary tower 42 and carriage 46. Again, it should be noted that carriage 48 of tower assembly 28, and other carriages associated with the tower assembly 30 on the foot end of surgery table 12, are similarly constructed. Carriage 46, in FIG. 6 is shown at its rear side, opposite to the front side orientation shown in FIG. 4. As it may be seen, tower 42 includes an inner open chamber 82 which hold gear racks 84 and 86. Carriage 46 includes a pawl mechanism 88 detailed in FIGS. 7 and 8.

Figure 7:
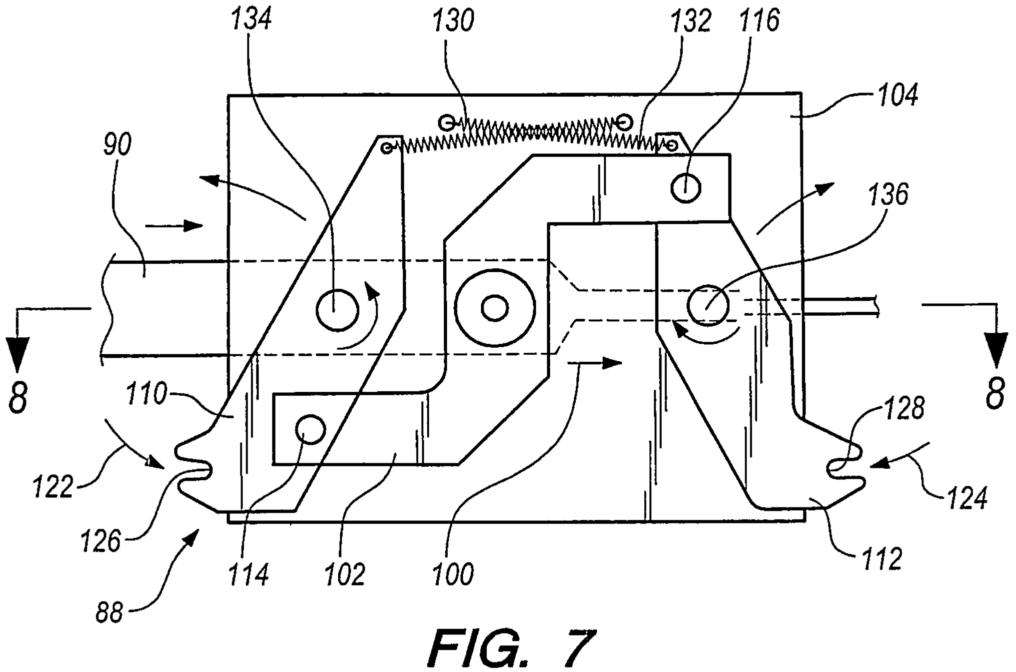
FIG. 7 is a front elevational view of the controlling mechanism of the carriage of the present invention.
Figure 8:
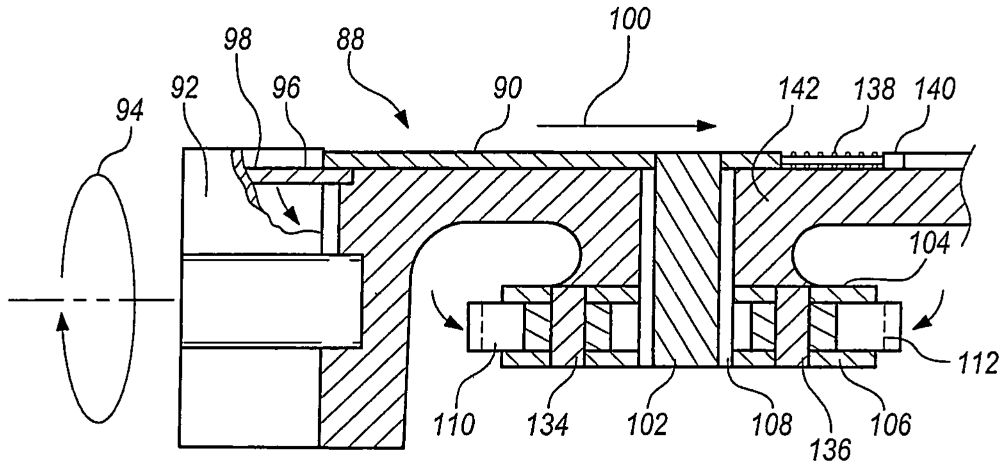
FIG. 8 is a sectional view taken along 8-8 of FIG. 7.

Viewing FIGS. 7 and 8, a controller in the form of a slide lever lock actuator 90 connects to slide lock knob 92 which is manually rotated according to directional arrow 94. Cam follower 96 moves along cam surface 98 to urge slide lever lock actuator 90 outwardly according to directional arrow 100. Such movement displaces lever lock actuator 102, in slot 108 as shown, by directional arrow 100 in FIGS. 7 and 8. Lever lock actuator 102 lies between plates 104 and 106. Plate 106 has been removed from FIG. 7 for sake of visibility of the pawl mechanism 88. Lever lock actuator 102 rotatably attaches to ratchet pawls 110 and 112 at pins 114 and 116, respectively. Again, movement of lever lock actuator 102, according to directional arrow 100, causes the rotation of ratchet pawls 110 and 112, indicated by directional arrows 122 and 124. Pawl notches 126 and 128 are held in engagement with the gear racks 84 and 86, respectively, in tower 42 by biasing springs 130 and 132. The inward rotation of ratchet pawls 110 and 112 according to directional arrows 122 and 124 will disengage pawl notches 126 and 128 from gear racks 84 and 86, respectively, allowing carriage 46 to travel upwardly and downwardly relative to gear racks 84 and 86. The release of knob 92 will cause pawls 110 and 112 to reengage gear racks 84 and 86 through the action of biasing springs 130 and 132, respectively. Of course, pawls 110 and 112 as well as gear racks 84 and 86 may be configured to allow carriage 46 to travel in an upward direction without the operation of slide lock knob 92, yet prohibit the downward motion of carriage 46 without the turning of slide lock knob 92, as heretofore described. It should be apparent that ratchet pawls 110 and 112 rotate relative to plates 104 and 106 by the use of pawl pins 134 and 136 held by plates 104 and 106, FIG. 8. Return spring 138 between slide lever lock actuator 90 and buttress 140 turns knob 94 to a rest position where pawls 110 and 112 are extended into engagement with gear racks 84 and 86. Buttress 140 is firmly attached to body member 142 of carriage 46.

Figure 8A:
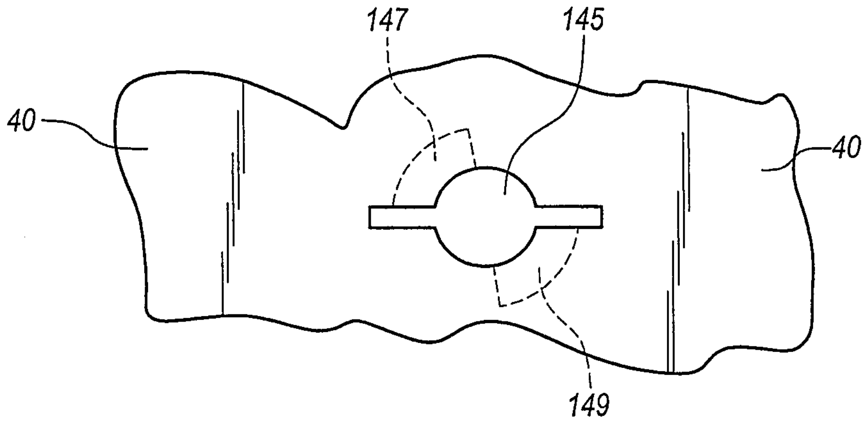
FIG. 8A is a top plan view of a crossbar of an end support having a single opening for capture of a single protuberance of a tower.
Figure 8B:
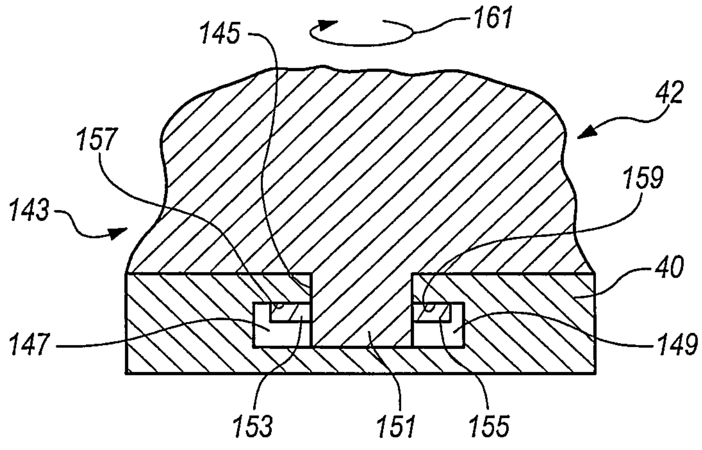
FIG. 8B is a sectional view along line 8B-8B of FIG. 8A with a tower protuberance in place.
Figure 9:
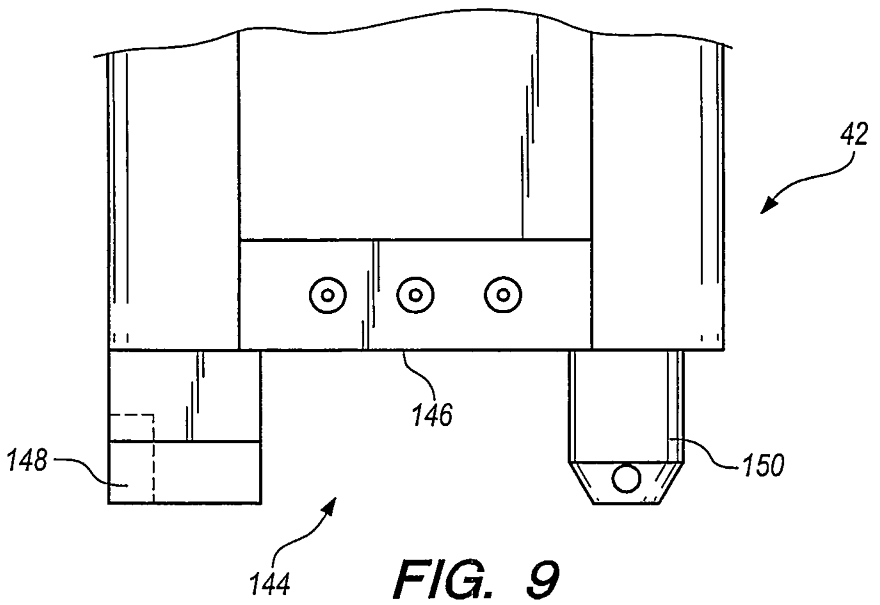
FIG. 9 is a partial front elevational view of the fixing mechanism of the tower portion of the apparatus of the present invention.
Figure 10:
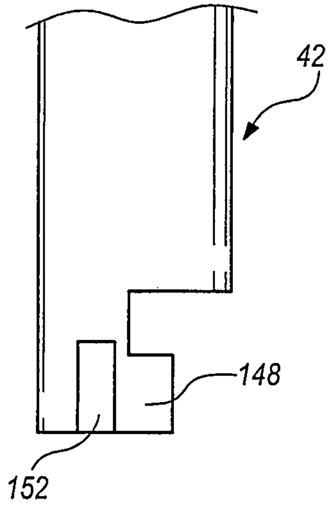
FIG. 10 is a left side view of FIG. 9.
Figure 11:
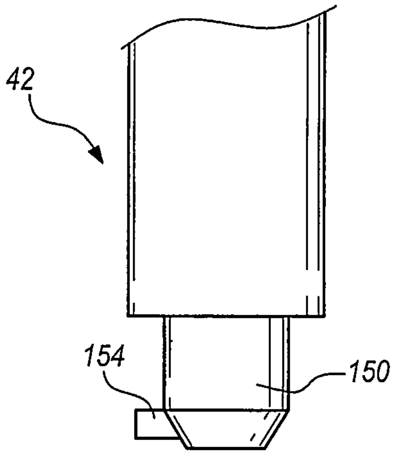
FIG. 11 is a right side view of FIG. 9.
Figure 12:
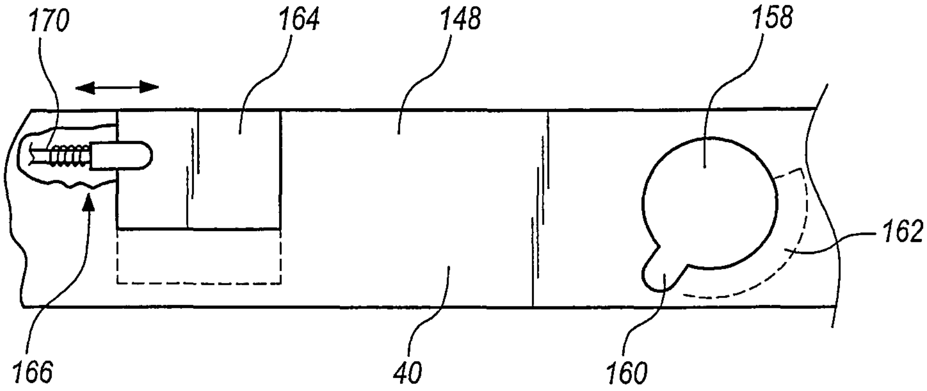
FIG. 12 is a top plan view of a surface of a crossbar of an end support receiving the tower fixing mechanism, depicted in FIGS. 9-11.

A basic mechanism 143 is revealed in FIGS. 8A and 8B for removably fixing tower 42 to crossbar 40 of first end support 14. In this regard an opening 145 is formed in crossbar 40 with undercut chambers 147 and 149. Protuberance 151 extends from tower 42 and includes lateral projections 153 and 155. Placement of protuberance 151 within opening 145 and twisting or turning of tower 42 and protuberance 151 will cause lateral projections 153 and 155 to engage surfaces or ceilings 157 and 159 of undercut chambers 153 and 155, respectively. Directional arrow 161 of FIG. 8B includes such twisting. Protuberance 151 and projections 153 and 155 remain in opening 145 by a tight tolerance construction of such components. However, a preloaded spring may be employed to bear against protuberance 151 within opening 145, if desired.

Figure 13:
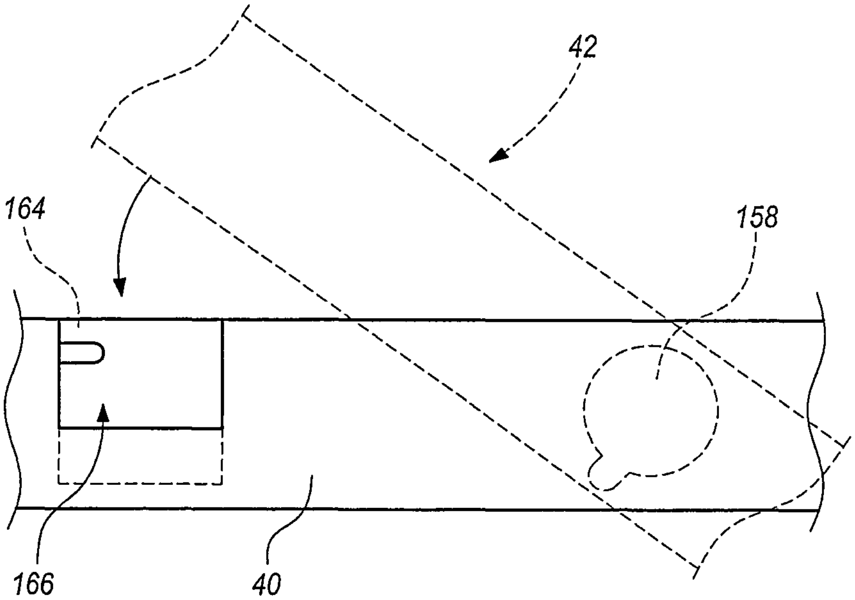
FIG. 13 is a top plan view of a carriage of an end support depicting the tower in phantom and indicating its movement into fixation relative to a crossbar of an end support.

With reference to FIGS. 9-13, a preferred mechanism 144 is depicted for removably fixing tower 42 to crossbar 40 of first end support 14. In this regard, tower 142 includes an end surface 146 into which protuberances 148 and 150 extend. Protuberance 148 bears a slot 152. Protuberance 150 is formed in a generally cylindrical shape with an extending boss 154. As may be apparent, upper surface 148 of crossbar 40 is formed with a first opening 158 having a recess 160 with an undercut hollow 162 shown in phantom on FIG. 12. A second opening 164 is also found on surface 148 of crossbar 40 and includes a spring loaded plunger 166. Plunger 166 is intended to engage slot 152 of protuberance 148. With reference to FIG. 13, once protuberance 150 is placed in opening 158, boss 154 rides in undercut hollow 162 and tower 42 is swung into place such that protuberance 148 of tower 142 enters second opening 164 and is held in place by spring biased plunger 166, concomitant with a snapping noise. As such, tower 42 engages and fits into crossbar 40 in a bayonet connection fashion. Knob 168 may be pulled to retract spring loaded plunger 166 via shaft 170 connected knob 168. Mechanism 144 also fixes tower 44 to crossbar 40 and fixes a similar tower or towers to a crossbar of tower assembly 28.

Figure 14:
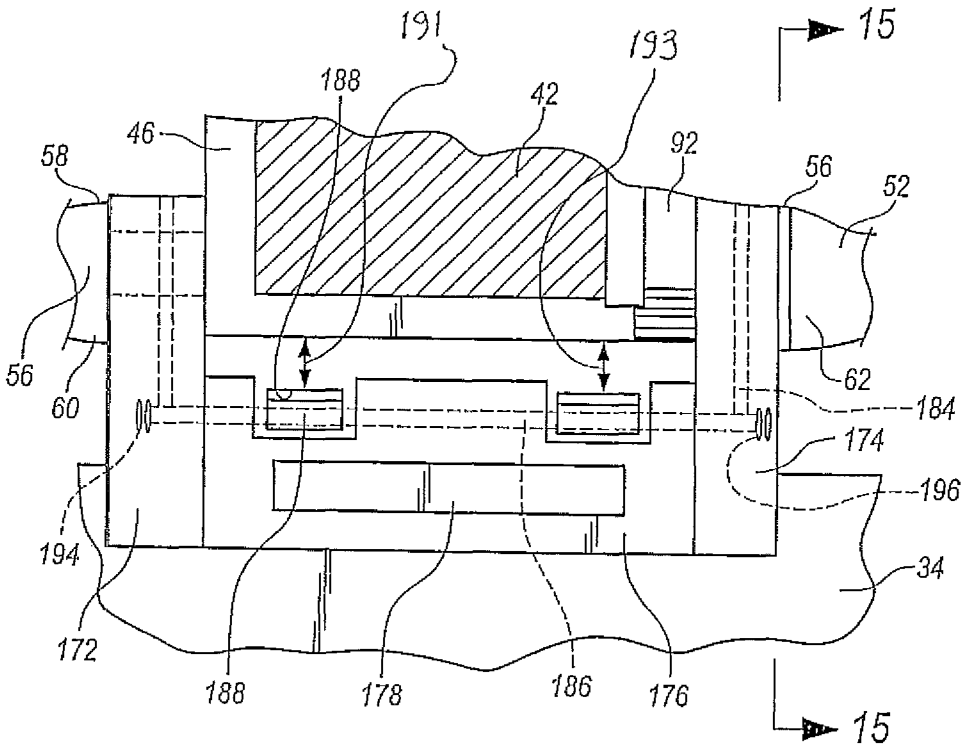
FIG. 14 is a partial top elevational view of the connectors employed with respect to a platform and stud engagement surfaces of a carriage.
Figure 15:
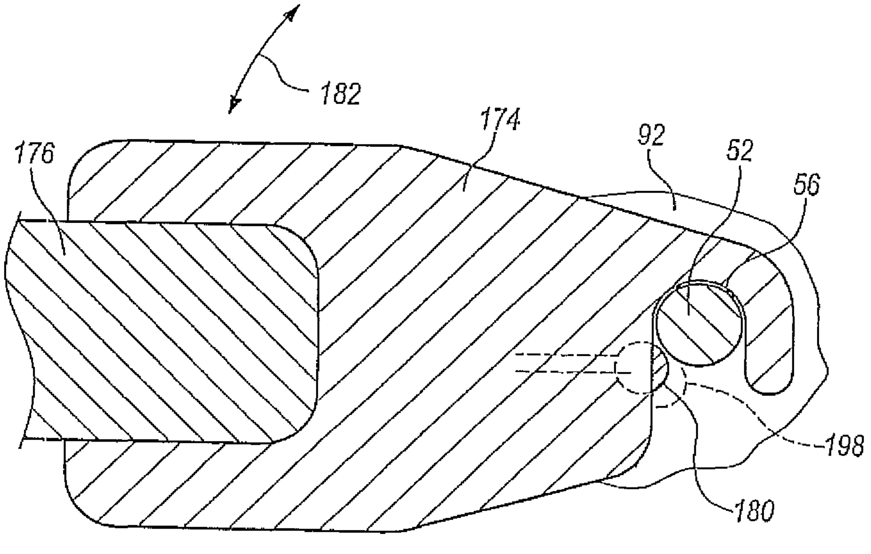
FIG. 15 is a sectional view taken along line 15-15 of FIG. 14.

With respect to FIGS. 14 and 15, the connection of platform 34 to carriage 46 is illustrated in that a pair of connectors 172 and 174 are shown. Connectors 172 and 174 are linked by a spanning body 176 having a handle 178. It should be noted that connectors 172 and 174 are similar to connectors 64 and 66 shown partially in FIG. 4 that are employed with respect to H-frame 32. Pairs of connectors, similar to connectors 172 and 174, are used at each end of platform 34 and H-frame 32. Each connector 172 and 174 is constructed as a claw-like member, illustrated in section on FIG. 15 with respect to connector 172. As may be seen from FIG. 15, claw-like connector 174 fits over engagement surface 56 of stud 52. Likewise, connector 172 would fit over engagement surface 58 of stud 50. Connectors 172 and 174 click into place by the use of a retractable tip, such as exemplary ball tip 180 used with respect to connector 174. Tip 180 also allows the rotation of connector 174, directional arrow 182, and is linked to paddle structure via rods 184 and 186. Paddle structure 188 which may be employed to release or retract tip 180 from its position against engagement surface 56 of stud 52, directional arrows 191 and 193. Springs 194 and 196 bias tip 180 into its extended position 198 (phantom) to hold claw-like connector 174 against engaging surface 56 of stud 52. Needless to say, table top 34 may be rotated should the table top 34, at the second end support 30, lie at a higher or lower level than the table top portion connected to first end support and tower assembly 28, and vice versa.

Figure 16:
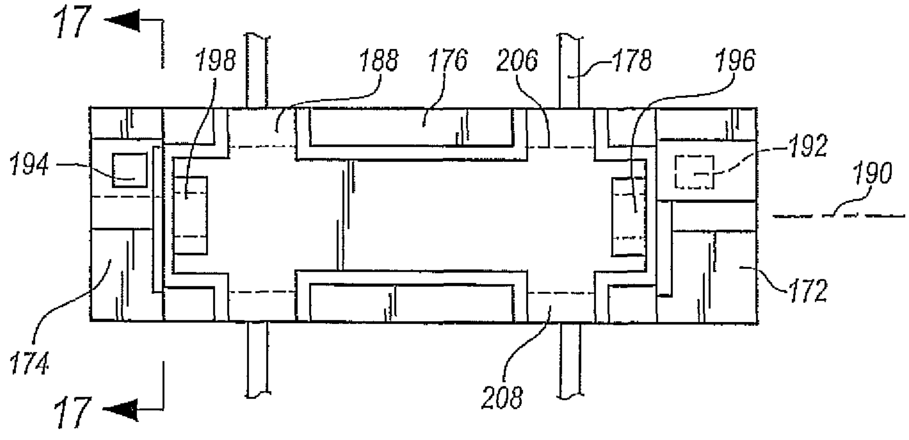
FIG. 16 is a front elevational view of the paddle release structure.
Figure 17:
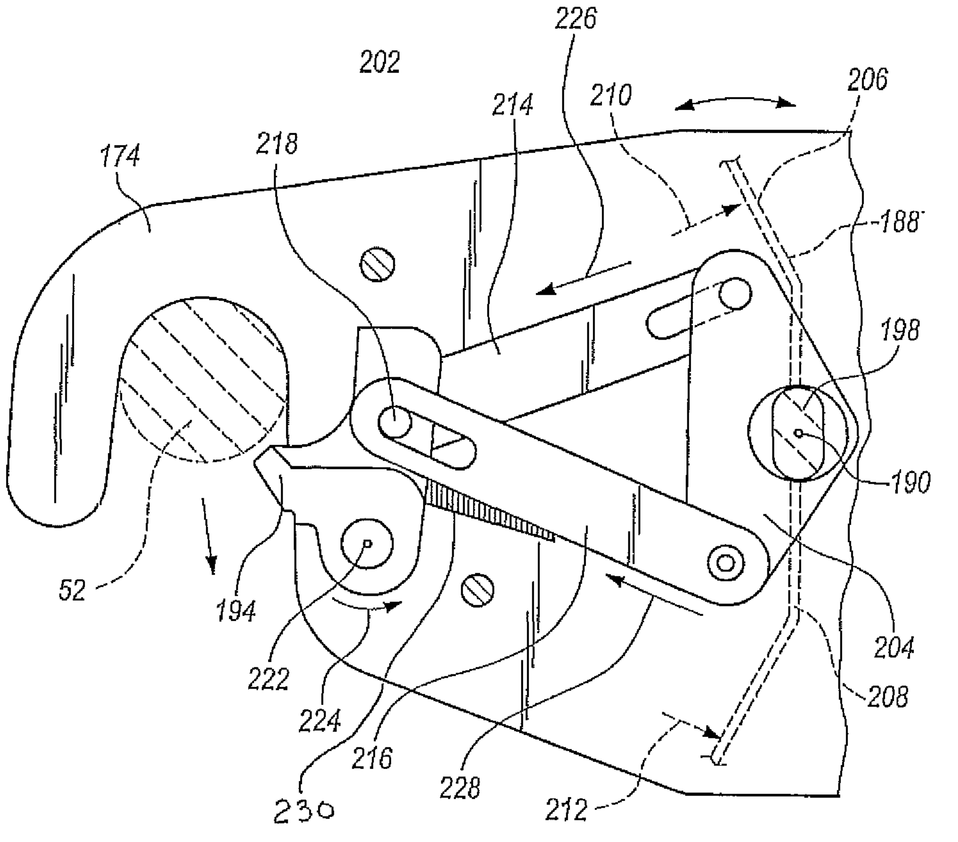
FIG. 17 is a sectional view taken along line 17-17 of FIG. 16.

FIGS. 16 and 17 depict a front view of connectors 172 and 174 as well as paddle structure 188 that rotates about axis 190, Paddle structure 190 links to alternate flattened projection tips 192 and 194 of connectors 172 and 174 via hubs 196 and 198, respectively. Spanning member 176 holds connectors 172 and 174 together. With particular reference to FIG. 17, another operation mechanism 202 for maneuvering tip 194 is shown. A similar mechanism maneuvers projection tip 192 associated with connector 172. A rotor 204 connects to hub 190 and turns with any force applied to upper portion 206 or lower portion 208 of paddle structure 188, directional arrows 210 and 212, FIG. 16. Slotted arms 214 and 216 engage pin 218 on body 220 which pivots about axis 222. Directional arrow 224 indicated such rotation and the release or retraction of flattened projection tip 194 from stud 52 when either slotted arm 214 or 126 moves toward pin 218, according to directional arrows 226 and 228, respectively. Spring 230 holds flattened projection tip 194 in place against stud 52, absent any force on paddle structure 188. In summary, paddle structure 186 releases flattened projection tip 194 by pressing of either upper portion 206 or lower portion 208, thereof.

In operation, the user attaches H-frame 32 and/or table top 34 to tower assemblies 28 and 30, which are similarly constructed, at the first end support 14 and the second end support 16 of surgery table 12. Tower assemblies 28 and 30 are erected using the bayonet structure illustrated in FIGS. 9-13, showing the exemplary connection of tower 42 to crossbar 40, FIG. 4. H-frame 32 and/or table top 34 are fastened to tower structure 28 by the interaction of the exemplar connectors 172 and 174 shown in FIGS. 14 and 15, which are similar to the connectors 64 and 66 illustrated in FIG. 4. The exemplar connectors 172 and 174 are held to exemplar tower 42 by the use of engagement surfaces 56 and 58 of studs 52 and 50. Paddle structure 188, FIGS. 16 and 17 may be employed to release connectors 172 and 174 from studs 50 and 52 via the exemplar mechanism 202, thus, freeing table top 34 from end supports 14 and 16. Exemplary carriage 46 positions tabletop 34 relative to exemplary tower 42 by the ratchet mechanism described in FIGS. 6-8. Of course, the structure described with respect to tower 42 and carriage 46 also applies to H-frame 32, tower 44, and carriage 48, as well as a similar arrangement with respect to tower assembly 30 associated with table top 34 and H-frame 32. Using the ratchet assembly illustrated in FIGS. 6-8, the user of surgery table 12 may adjust either end of H-frame 32 or table top 34 upwardly, downwardly and/or into a Trendelenberg or reverse Trendelenberg configuration.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A device linking a platform to a surgery table end support, comprising:

first and second connectors extending from the surgery table end support, said first and second connectors comprising claw members;

at least one engagement surface provided by the surgery table end support, said first connector being rotatably held to said at least said one engagement surface of the surgery table end support;

a spring actuated projection extending from said claw member, said spring actuated projection contacting said engagement surface of the surgery table;

a paddle structure rotatable relative to said first and second connectors; and a release mechanism for disengaging said spring actuated projection, said release mechanism comprising:

a rotor turning on a first axis; a body rotating on a second axis; a first arm linked to said rotor and said body, said first arm turning said body about said second axis upon the exertion of a force on said paddle structure; and a second arm linked to said rotor and said body:

said second arm turning said body about said second axis upon the exertion of a force on said paddle structure.

2. The device of claim 1 in which additionally comprises a second engagement surface provided by the surgery table end support, said second connector being rotatably connected to said second engagement surface.

3. The device of claim 1 in which said spring actuated projection comprises a spring actuated tip.

4. The device of claim 1 in which the surgery table includes a tower linked to the surgery table end support and a carriage movably fixed to the tower, and said at least one engagement surface locates at said carriage.

5. The device of claim 1 in which said paddle structure is rotatable about said first axis, said paddle structure including a first portion extending from said first axis in one direction, and a second portion extending from said first axis in another direction.

* * * * *